(12) United States Patent
Zhang (10) Patent No.: US 11,637,499 B2
(45) Date of Patent: Apr. 25, 2023

(54) POWER CONVERTER WITH ADAPTIVE ACTIVE CLAMP

(71) Applicant: DIALOG SEMICONDUCTOR INC., Campbell, CA (US)

(72) Inventor: Xiaoyong Zhang, Campbell, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 17/445,719

(22) Filed: Aug. 23, 2021

(65) Prior Publication Data

US 2023/0056711 A1 Feb. 23, 2023

(51) Int. Cl.
*H02M 3/335* (2006.01)
*H02M 1/08* (2006.01)
*H02M 1/34* (2007.01)

(52) U.S. Cl.
CPC ....... *H02M 3/33507* (2013.01); *H02M 1/083* (2013.01); *H02M 1/346* (2021.05); *H02M 3/33569* (2013.01)

(58) Field of Classification Search
CPC ............ H02M 3/22; H02M 3/24; H02M 3/28; H02M 3/315; H02M 3/335; H02M 3/33507; H02M 3/33515; H02M 3/33523; H02M 3/3353; H02M 3/33538; H02M 3/33546; H02M 3/33553; H02M 3/33569; H02M 3/33576; H02M 3/33584; H02M 3/33592; H02M 1/0009; H02M 1/0025; H02M 1/0038; H02M 1/0048; H02M 1/0054; H02M 1/0058; H02M 1/14; H02M 1/15; H02M 1/32; H02M 1/08; H02M 1/083; H02M 1/34–348
USPC ........... 363/15–21.18, 49–58, 123, 131–134; 323/222–226, 235, 238, 266, 271–278, 323/280, 282–288, 351, 901; 361/78, 79, 361/83, 84, 86, 87, 88–92, 93.1, 93.5, 361/93.7
See application file for complete search history.

(56) References Cited

U.S. PATENT DOCUMENTS

| | | | |
|---|---|---|---|
| 10,177,670 B1* | 1/2019 | Lin | H02M 3/33507 |
| 2010/0246215 A1* | 9/2010 | Mase | H02M 3/33569 |
| | | | 363/21.04 |
| 2020/0091826 A1* | 3/2020 | Yang | H02M 3/33523 |
| 2021/0143730 A1* | 5/2021 | Yang | H02M 3/33507 |

* cited by examiner

*Primary Examiner* — Thienvu V Tran
*Assistant Examiner* — Carlos O Rivera-Perez
(74) *Attorney, Agent, or Firm* — Haynes & Boone, LLP (57) ABSTRACT

An active-clamp flyback converter is provided with improved active-clamp switch control that switches on an active-clamp switch at an active-clamp switch on-time that equals a power switch on-time minus a peak charge time for an active-clamp capacitor. The peak charge time is the duration between the switching off of the power switch transistor and when the charging current through the active-clamp capacitor falls to zero. The controller measures this peak charge time following the switching off of the power switch transistor and then applies it to the subsequent switching on of the active-clamp switch so that the active-clamp switch is switched on at the power switch on-time minus the peak charge time.

19 Claims, 12 Drawing Sheets

FIG. 10 charging an active-clamp capacitor to a peak charge over a peak charge time period in response to a switching off of a power switch transistor — 1100 during an off-time of the power switch transistor after the active-clamp capacitor is charged to the peak charge, switching on an active-clamp switch transistor at an active-clamp on-time that equals a difference between a subsequent power switch on-time of the power switch transistor and the peak charge time period — 1105 switching off the active-clamp switch transistor at an active-clamp off-time that equals the active-clamp on-time plus the peak charge time period — 1110 switching on the power switch transistor at the subsequent power switch transistor on-time — 1115

FIG. 11

POWER CONVERTER WITH ADAPTIVE ACTIVE CLAMP

TECHNICAL FIELD

This application relates to switching power converters, and more particularly to a switching power converter with adaptive control of the active-clamp transistor.

BACKGROUND

The high efficiency of switching power converters such as flyback converters has led to their virtual universal adoption as the battery charger for mobile devices. In a flyback converter, a primary-side controller controls the cycling of a power switch transistor that connects between the transformer's primary winding and ground. A rectified AC mains voltage drives the primary winding current when the power switch transistor is cycled on. While the power switch transistor is on, energy builds up in the magnetizing inductance of the primary winding. This energy is then delivered to the load when the secondary-side current begins flowing through the transformer's secondary winding. But due to non-idealities of the transformer, a parasitic leakage inductance of the primary winding is not coupled to the secondary winding. As the power switch transistor is cycled off, energy from the parasitic leakage inductance charges a parasitic capacitance of the power switch transistor, which causes a drain-to-source voltage across the power switch transistor to rapidly increase and begin resonantly oscillating. This rapid increase of the drain-to-source voltage across the power switch transistor may damage the power switch transistor and even lead to catastrophic failure of the power switch transistor. In addition, the spiking of the drain-to-source voltage reduces power efficiency.

Figure 1:
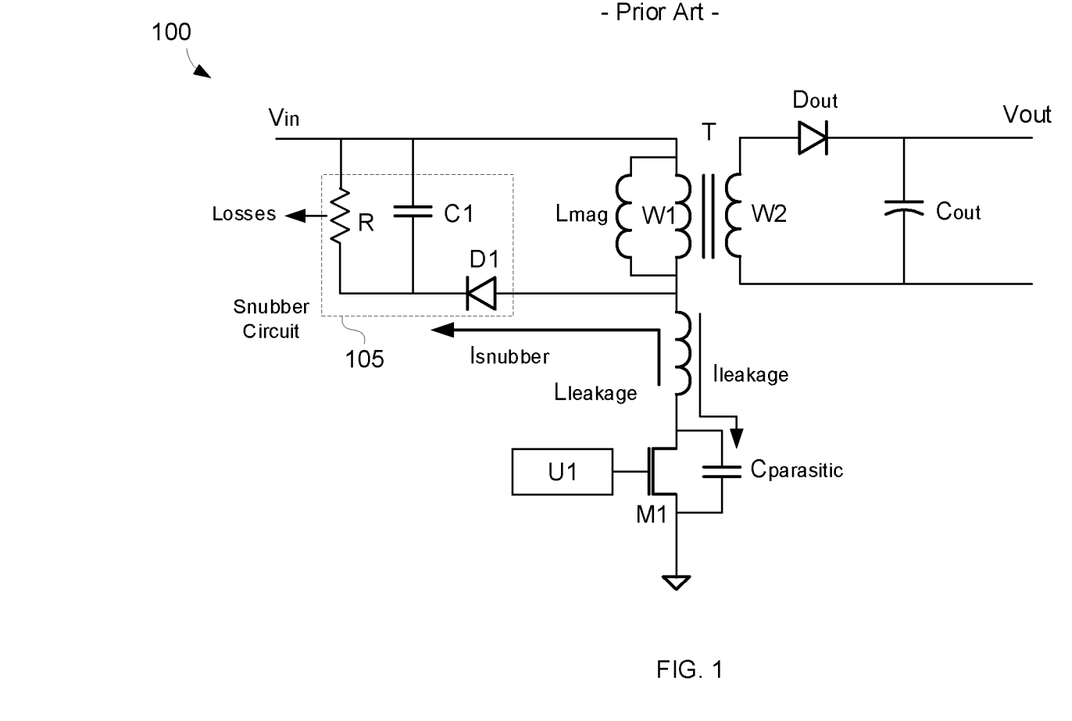
FIG. 1 is a circuit diagram of a conventional flyback converter with a snubber circuit.

To protect the power switch transistor, it is conventional to include a snubber circuit. An example snubber circuit 105 in a flyback converter 100 is shown in FIG. 1. During a power switch cycle, a primary-side controller U1 switches on a power switch transistor M1 so that an input voltage Vin causes a magnetizing current to ramp up in the magnetizing inductance (Lmag) of a primary winding W1 of a transformer T. While the power switch transistor M1 is conducting, an output diode Dout is reverse biased to prevent a secondary winding current from flowing through a secondary winding W2. After the power switch transistor cycles off, the secondary winding current conducts to charge an output capacitor Cout with an output voltage (Vout) for a load (not illustrated).

Figure 2:
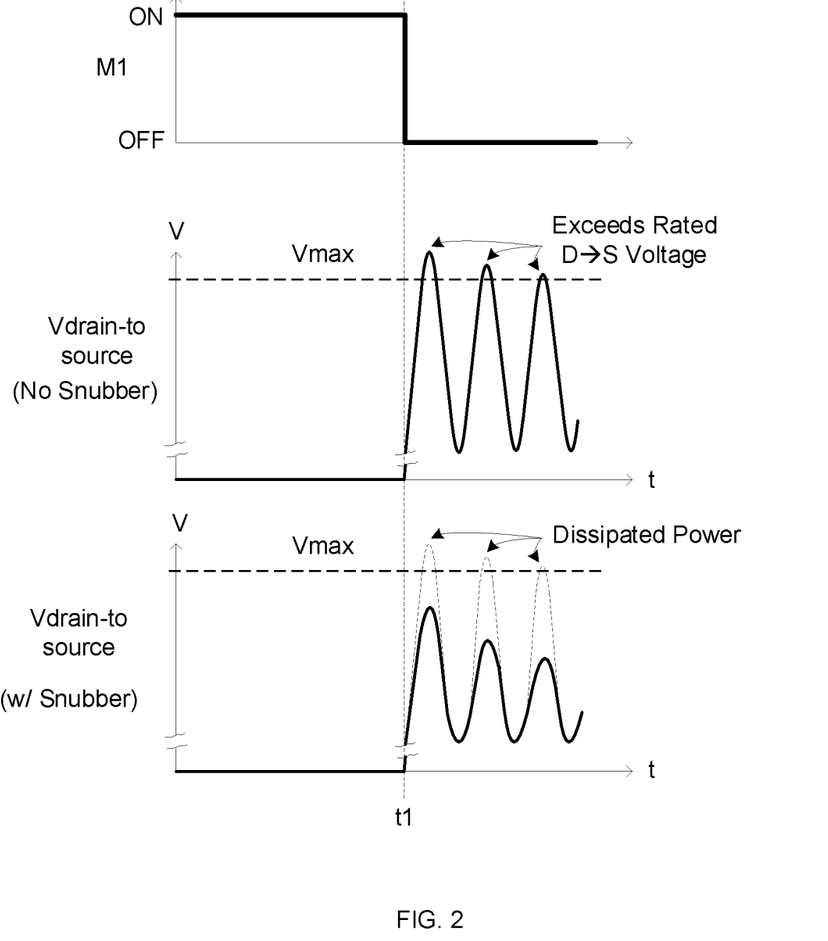
FIG. 2 illustrates some operating waveforms for a conventional flyback converter with and without a snubber circuit.

But energy was also stored in the leakage inductance (Ileakage) of the primary winding W1 while the power switch transistor M1 is on. Since the leakage inductance is not coupled to the secondary winding W1, this stored energy then charges a parasitic capacitance (Cparasitic) of the power switch transistor M1 after the power switch transistor M1 switches off. Without snubber circuit 105, the drain-to-source voltage of the power switch transistor M1 may increase to damaging levels. For example, some operating waveforms for flyback converter 100 with and without snubber circuit 105 are shown in FIG. 2. At a time t1 the power switch transistor M1 is switched off, which causes the drain-to-source voltage of the power switch transistor M1 in the absence of a snubber to resonantly exceed over a maximum voltage Vmax that is the limit of the safe drain-to-source voltage for power switch transistor M1. This exceeding of the safe voltage limit Vmax may then damage power switch transistor M1 or even cause it to fail catastrophically.

Referring again to flyback converter 100, a diode D1 in snubber circuit 105 becomes forward-biased as the drain-to-source voltage of the power switch transistor M1 increases after it is cycled off. A snubber current (Isnubber) then flows through diode D1 to charge a snubber capacitor C1 that couples from diode D1 in parallel with a snubber resistor R to an input voltage rail for the input voltage Vin. A capacitance of the snubber capacitor C1 is significantly larger than the parasitic capacitance of the power switch transistor M1. The excess voltage at the drain of the power switch transistor M1 is thus safely dissipated in the snubber resistor R. As shown in FIG. 2, the drain-to-source voltage across the power switch transistor M1 stays below the safe maximum voltage Vmax so that the power switch transistor M1 is protected. However, the resulting dissipation of energy in snubber circuit 105 lowers efficiency.

Figure 3:
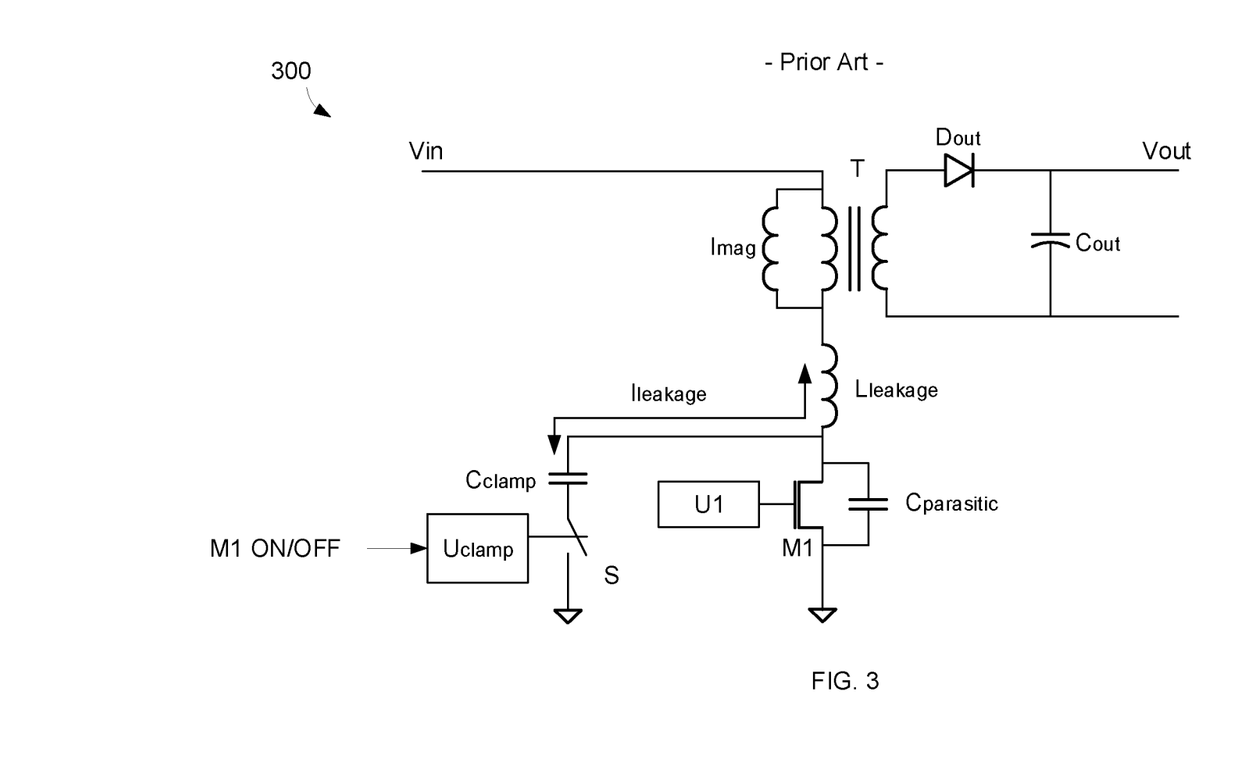
FIG. 3 illustrates a conventional active-clamp flyback (ACF) converter.
Figure 4:
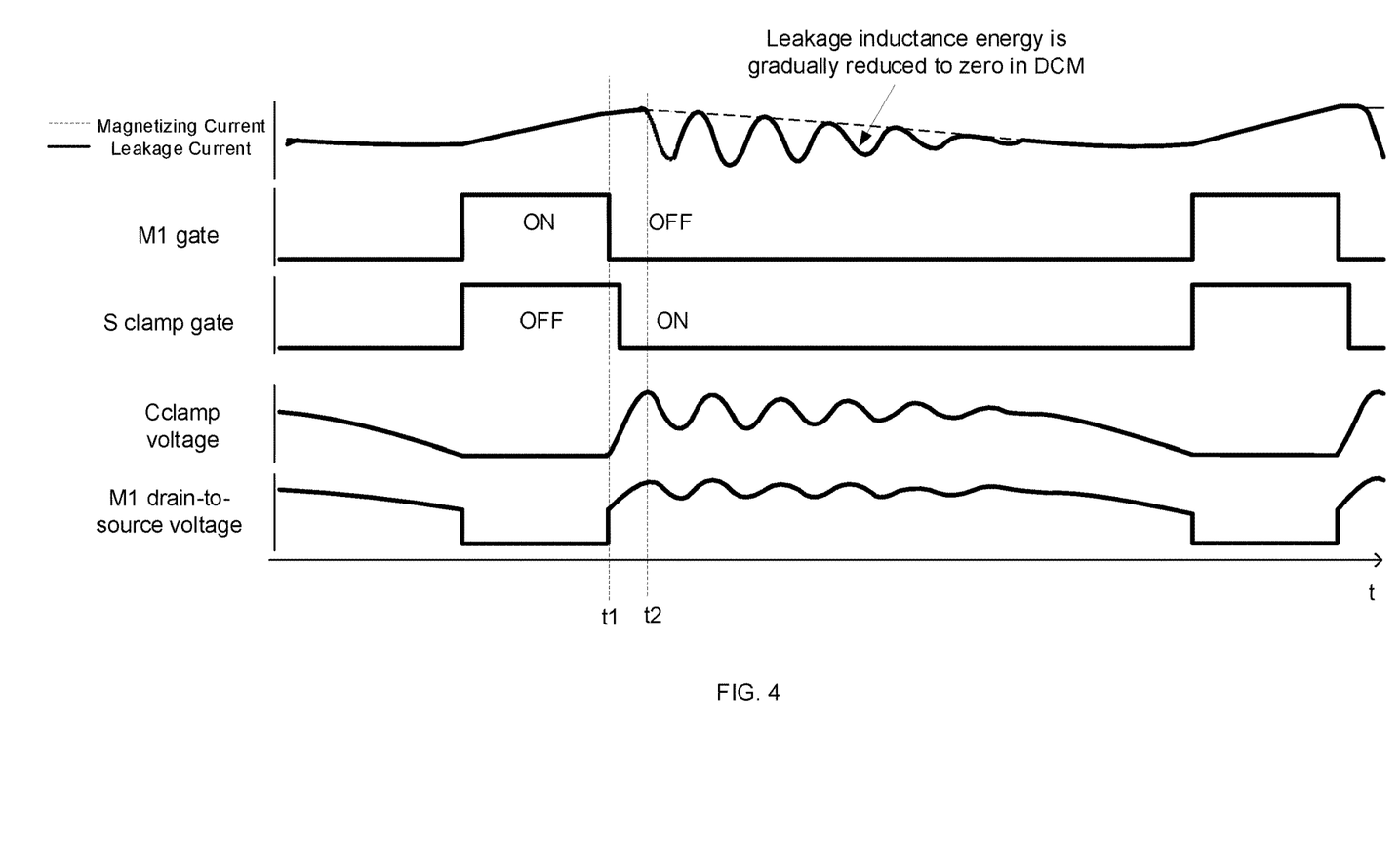
FIG. 4 illustrates some operating waveforms for an active-clamp flyback converter.

To protect the power switch transistor without the power loss of a snubber circuit, it is known to use an active-clamp switch S (for example, a PMOS switch transistor) as shown in FIG. 3 for a flyback converter 300. While the power switch transistor (M1) is on, the active-clamp switch is off as controlled by an active-clamp controller (Uclamp). When the power switch transistor cycles off, the active-clamp controller switches on the active-clamp switch. The active-clamp switch couples between ground and an active-clamp capacitor that couples to the drain of the power switch transistor. The serial combination of the active-clamp capacitor and the leakage inductance forms a resonant circuit that stores the leakage inductance energy that would otherwise cause the drain-to-source voltage of the power switch transistor to pulse to a potentially-damaging level. Some operating waveforms for flyback converter 300 in which the active-clamp switch is an active-clamp PMOS switch transistor are shown in FIG. 4. When the power switch transistor is on, the active-clamp switch transistor is off. The power switch transistor cycles off at a time t1. The leakage current then increases to a maximum value at a time t2 when the voltage across the active-clamp capacitor reaches a maximum (the peak charge voltage). The active-clamp capacitor then resonantly charges and discharges while the active-clamp switch is on and the power switch is off. This resonant charging and discharging of the active-clamp capacitor prevents a resonant oscillation of the drain-to-source voltage across the power switch transistor from reaching unsafe levels. To reduce stress even further across the power switch transistor, valley-mode switching may be used in which the power switch transistor is cycled on at the valleys (the minimum voltage points) in the resonant oscillation of the drain-to-source voltage across the power switch transistor. These minimums may not reach zero volts. The ringing is eventually damped to equal the input voltage Vin if the power switch off time is sufficiently long.

Accordingly, there is a need in the art for improved control of active-clamp switching for active-clamp flyback converters.

SUMMARY

In accordance with an aspect of the disclosure, an active-clamp flyback converter is provided that includes: a power switch; an active-clamp switch; an active-clamp capacitor in series with the active-clamp switch; and an active-clamp controller configured to measure a peak charge time of the active-clamp capacitor and to switch on the active-clamp switch at a time equaling a difference between a turn-on time for the power switch and the peak charge time.

In accordance with another aspect of the disclosure, a method of operation for an active-clamp flyback converter is provided that includes: charging an active-clamp capacitor to a peak charge over a peak charge time period in response to a switching off of a power switch transistor; during an off-time of the power switch transistor after the active-clamp capacitor is charged to the peak charge, switching on an active-clamp switch transistor at an active-clamp on-time that equals a difference between a subsequent power switch on-time of the power switch transistor and the peak charge time period; switching off the active-clamp switch transistor at an active-clamp off-time that equals the active-clamp on-time plus the peak charge time period; and switching on the power switch transistor at the subsequent power switch on-time.

In accordance with yet another aspect of the disclosure, an active-clamp controller for an active-clamp flyback converter is provided that includes: a comparator configured to compare a voltage across an active-clamp resistor to a threshold voltage; a counter configured to provide a count representing a peak charge time of an active-clamp capacitor, the counter being further configured to stop a counting of the count in response to an output signal from the comparator indicating that the voltage across the active-clamp resistor equals the threshold voltage; and an active-clamp switch transistor gate driver configured to switch on an active-clamp switch transistor at an active-clamp on-time that equals an on-time of a power switch transistor minus the peak charge time.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A flyback converter is provided that measures the peak charge time of the active clamp capacitor to provide improved active-clamp switch control. The peak charge time is also denoted as a peak charge period herein. The peak charge time of the active-clamp capacitor will tend to vary from flyback converter to flyback converter. To account for this variability, the peak charge time may be measured at startup and re-calibrated if necessary during operation. Referring again to FIG. 4, the peak charge time begins at a time t1 when the power switch transistor switches off. The peak charge time ends at a time t2 when the charging current stops flowing through the active-clamp capacitor due to it being charged to its peak voltage at time t2.

Figure 5:
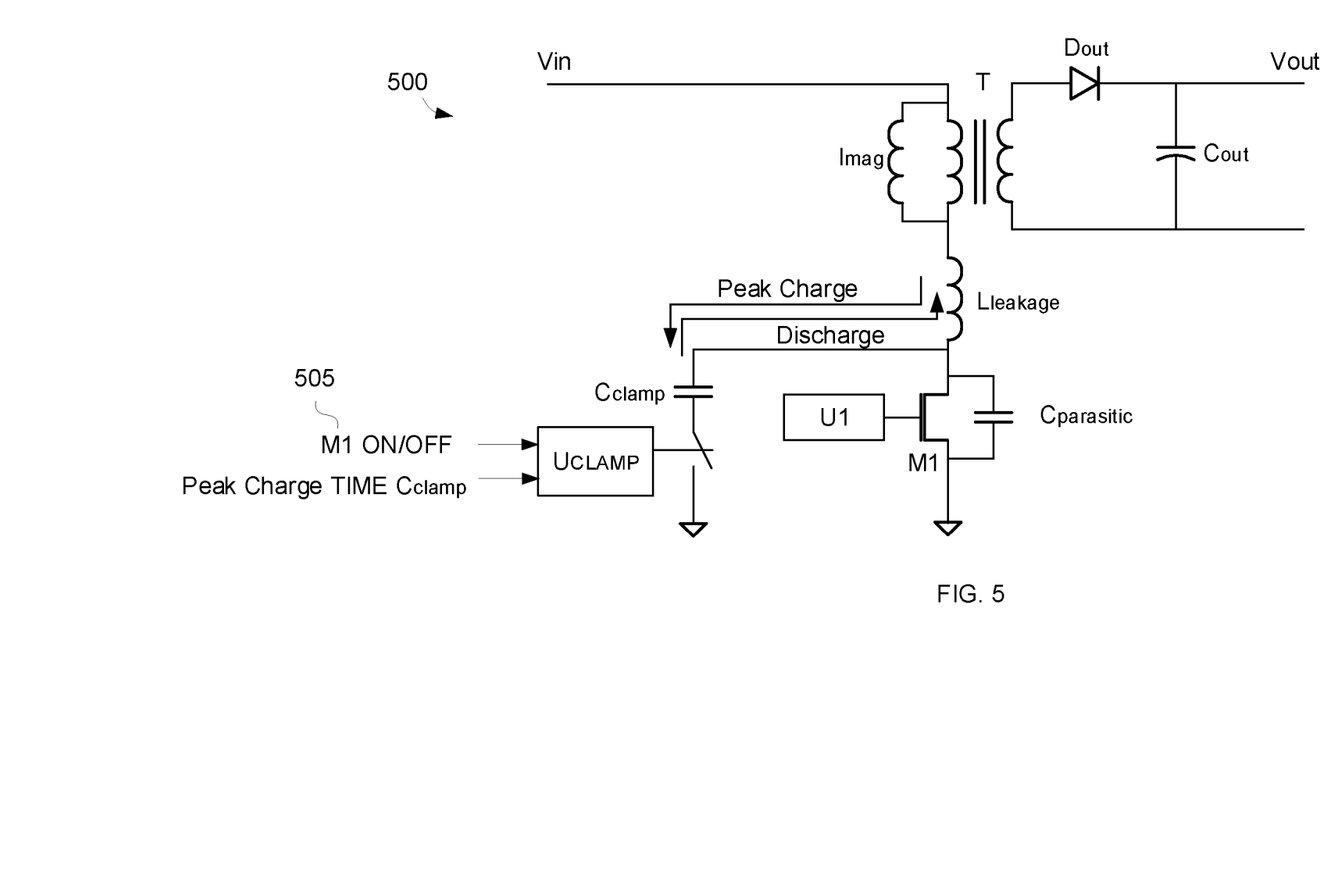
FIG. 5 is a circuit diagram of a flyback converter with improved active-clamp switching control in accordance with an aspect of the disclosure.

An example active-clamp switch controller (Uclamp) in a flyback converter 500 is shown in FIG. 5. The active-clamp switch controller controls the switching of an active-clamp switch (S) that is in series with the active-clamp capacitor (Cclamp). The remaining components in flyback converter 500 are arranged analogously as those discussed for flyback converter 300. During a power switch cycle, a primary-side controller (U1) switches on the power switch transistor so that an input voltage Vin causes a magnetizing current to ramp up from zero to a peak current in the magnetizing inductance (Lmag) of the primary winding W1 of the transformer T. While the power switch transistor is conducting, an output diode Dout is reverse biased to prevent a secondary winding current from flowing through a secondary winding W2. However, it will be appreciated that the secondary-winding current may be rectified by a synchronous rectifier (SR) switch transistor in alternative embodiments. When the power switch transistor cycles off, the secondary-winding current conducts to charge the output capacitor Cout with an output voltage (Vout) for a load (not illustrated).

But energy was also stored in the leakage inductance (Ileakage) of the primary winding W1 while the power switch transistor was on. Since the leakage inductance is not magnetically coupled to the secondary winding W1, this stored energy could charge a parasitic capacitance (Cparasitic) of the power switch transistor to a potentially-damaging voltage in the absence of the active-clamp switch and the active-clamp capacitor when the power switch transistor M1 switches off. But this leakage energy is instead captured in the active-clamp capacitor by charging the active-clamp capacitor to its peak charge in the peak charge time after the power switch transistor cycles off. In particular, the active-clamp controller may receive a control signal 505 that identifies when the power switch transistor M1 is switched off. Note that the active-clamp controller and the primary-side controller are shown separately for illustration purposes but may be integrated into a single controller integrated circuit in some embodiments. Since the primary-side controller is driving the gate of the power switch transistor to switch the power switch transistor on and discharging the gate to switch the power switch transistor off, this control information is readily signaled to the active-clamp controller as control signal 505. When control signal 505 alerts the active-clamp controller that the power switch transistor is switching off, the active-clamp controller may switch on the active-clamp switch to conduct a charging current for the peak charge time so that the leakage energy charges the active-clamp capacitor to its peak charge. At the expiration of the peak charge time, the active-clamp controller may then switch off the active-clamp switch so that the active-clamp capacitor retains its peak charge.

The peak charge time is again used during the cycling on of the power switch transistor. The on-time of the power switch transistor M1 depends upon the modulation of the power switch transistor M1 by the primary-side controller. In a pulse-width modulation (PWM), the on-time is typically fixed such as controlled by a clock signal. It is just the off time that is varied in PWM such that the appropriate duty cycle may be employed to keep the load in regulation. In a pulse-frequency modulation (PFM), the on-time of the power switch transistor may vary depending upon the cycling frequency of the power switch transistor M1. Regardless of whether the modulation is PWM or PFM (or some other suitable modulation), the on-time of the power switch transistor M1 is known and may be signaled to the active-clamp controller through control signal 505. Should the on-time be scheduled for a time $t_{on}$, the active-clamp controller functions to switch on the active-clamp switch at an active-clamp on-time equaling the power switch on-time $t_{on}$ minus the peak charge time. This cycling on of the active-clamp switch S causes the stored energy in the active-clamp capacitor to conduct a discharge current into the primary winding so as to discharge the drain of the power switch transistor M1 towards ground.

Figure 6:
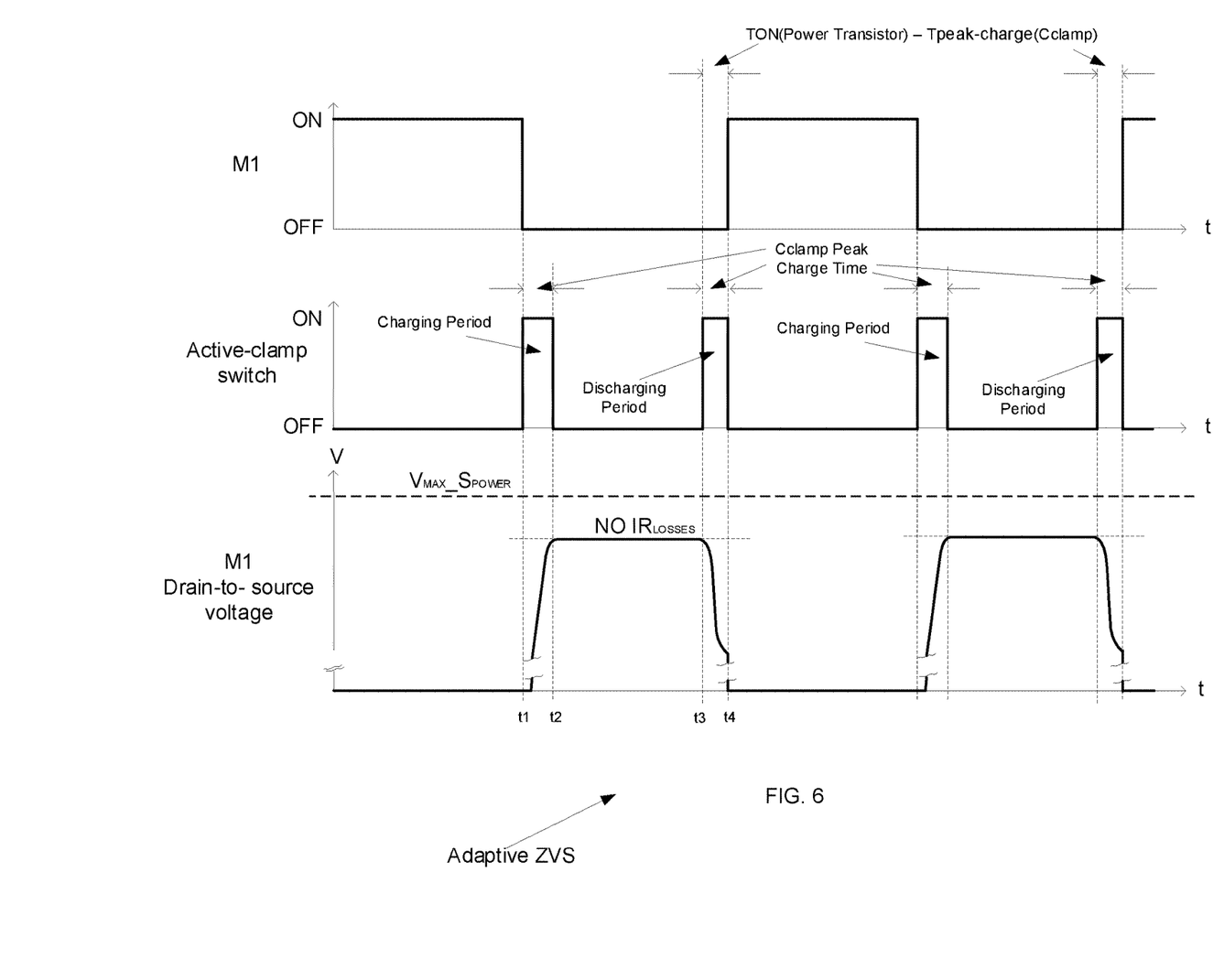
FIG. 6 illustrates some operating waveforms for the improved flyback converter of FIG. 5.

Some example operating waveforms for flyback converter 500 are shown in FIG. 6. In an initial switching cycle, the power switch transistor cycles off at a time t1. In response, the active-clamp controller cycles on the active-clamp switch for the peak charge time, which ends at a time t2. The drain-to-source voltage of the power switch transistor ramps to a high value after time t1 but does not resonantly oscillate due to the switching off of the active-clamp switch at time t2. There are thus no IR losses with regard to any repeated discharging or charging of the parasitic capacitance of the power switch transistor. The next power switching cycle begins at a time t4 when the power switch transistor again cycles on. At a time t3 that is prior to time t4 by the peak charging time, the active-clamp controller again switches on the active-clamp switch, which is maintained on until time t4. By keeping the active-clamp switch on for the peak charge time from time t3 to t4, the full amount possible of discharge current conducts from the active-clamp capacitor through the primary winding to produce a minimum voltage (e.g., zero volts) at the drain of the power switch transistor. In this fashion, the power switch transistor may be cycled on with zero-voltage switching (no voltage across the power switch transistor) at time t4. Alternatively, the power switch transistor may be cycled on at a valley voltage that is significantly lower than the valley switching discussed for conventional active-clamp flyback (ACF) converter 300.

Note that the waveforms shown in FIG. 6 are independent of whether flyback converter 500 is operating in continuous conduction mode or discontinuous conduction mode. In contrast, the conventional active clamp flyback converter 300 is limited only to active-clamp operation in the discontinuous conduction mode. In contrast, since the peak charge time is used for both the charging and discharging of the active-clamp capacitor in flyback converter 500, the active-clamp operation of flyback converter 500 is effective regardless of whether operation occurs in a continuous conduction mode (CCM) or a discontinuous conduction mode (DCM). In addition, since the active-clamp capacitor and the parasitic capacitance of the power switch transistor do not resonantly charge and discharge repeatedly during the off-time of the power switch transistor M1, IR path losses are reduced. In contrast, note that such IR path losses are higher for the conventional flyback converter 300. The IR losses from the continued charging and discharging of the active-clamp capacitor after time t2 as shown in FIG. 4 causes the maximum value of the active-clamp capacitor voltage to decline. Since the active-clamp switch is maintained off in flyback converter 500 from time t2 to time t3 as shown in FIG. 6, these IR losses are avoided. But in conventional flyback converter 300, the leakage inductance energy is gradually reduced to zero over the power switch transistor off time as shown in FIG. 4.

Figure 7A:
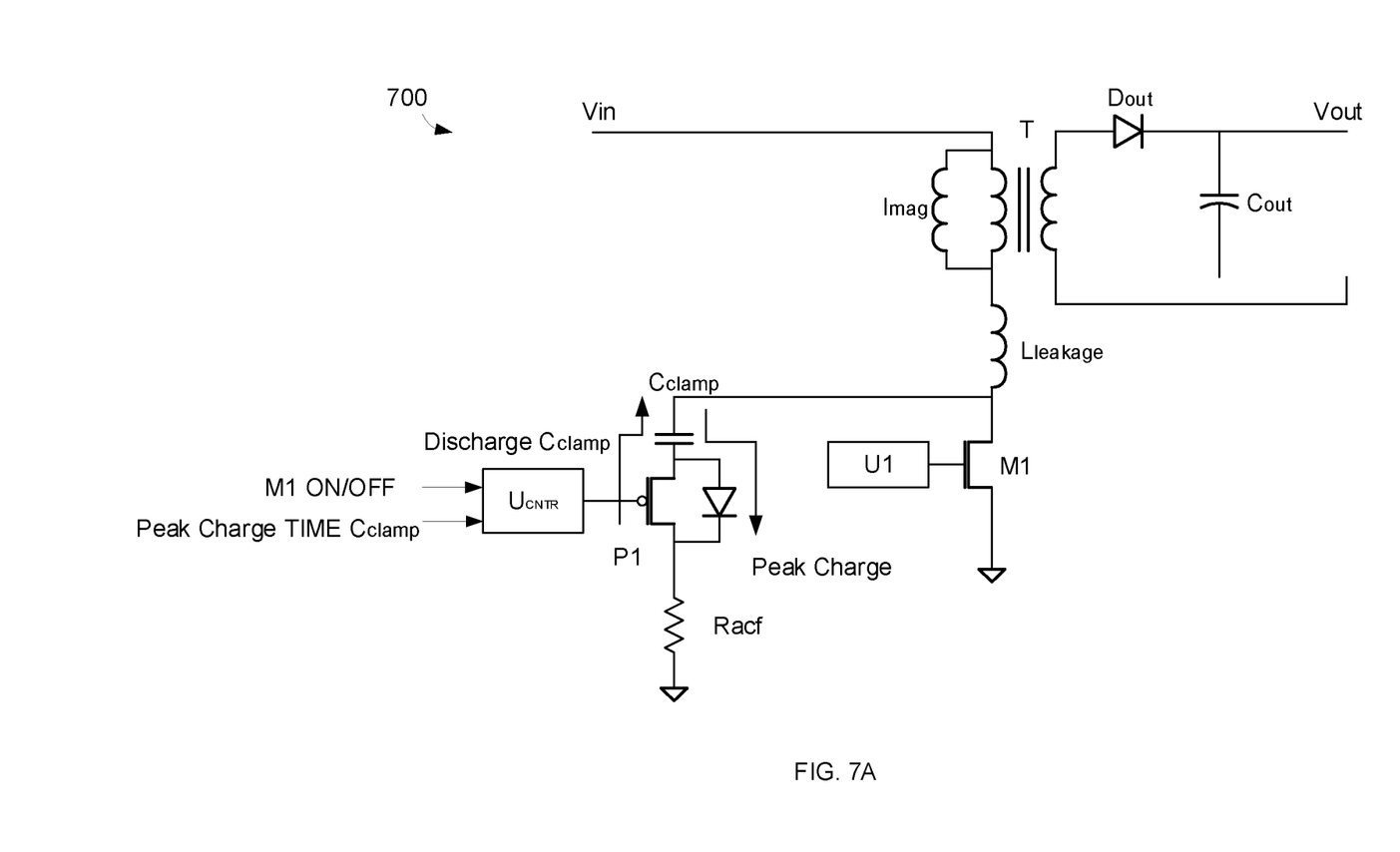
FIG. 7A is a circuit diagram of a flyback converter with improved active-clamp switching control of a PMOS active-clamp switch transistor in accordance with an aspect of the disclosure.

The active-clamp switch may be implemented using a PMOS transistor P1 as shown for a flyback converter 700 of FIG. 7A. A drain of transistor P1 couples to ground through an active-clamp flyback resistor (Racf). A source of transistor P1 couples to a first plate of the active-clamp capacitor (Cclamp). A second plate of the active-clamp capacitor couples to the drain of the power switch transistor (M1). Implementing the active-clamp switch using transistor P1 is quite advantageous as an active-clamp controller ($U_{CNTR}$) may then leave transistor P1 off while the active-clamp capacitor is charged to its peak voltage (the equivalent of the period from time t2 to time t3 of FIG. 6). A body diode for transistor P1 conducts the charging current during this time. This simplifies the control by the active-clamp controller and also diminishes the possibility of punch-through that occurs when both the power switch transistor and transistor P1 are on at the same time. The active-clamp controller in flyback converter 700 would thus only switch on transistor P1 at the peak charge time period before the power switch transistor M1 turn-on time to conduct the discharge current analogously as discussed for flyback converter 500. The remaining components of flyback converter 700 are as discussed for flyback converter 500.

Although the active-clamp flyback converters disclosed herein such as active-clamp flyback converters 500 and 700 use a "low-side" active-clamp switch, the adaptive active-clamp switching control disclosed herein is also applicable to "high-side" active-clamp switch topologies in which the active-clamp switch and the active-clamp capacitor couple from the drain of the power switch transistor to the input voltage rail for the input voltage Vin. In contrast, the serial combination of the active-clamp capacitor and the active-clamp switch couple from the drain of the power switch transistor to ground in low-side active-clamp topologies.

Figure 7B:
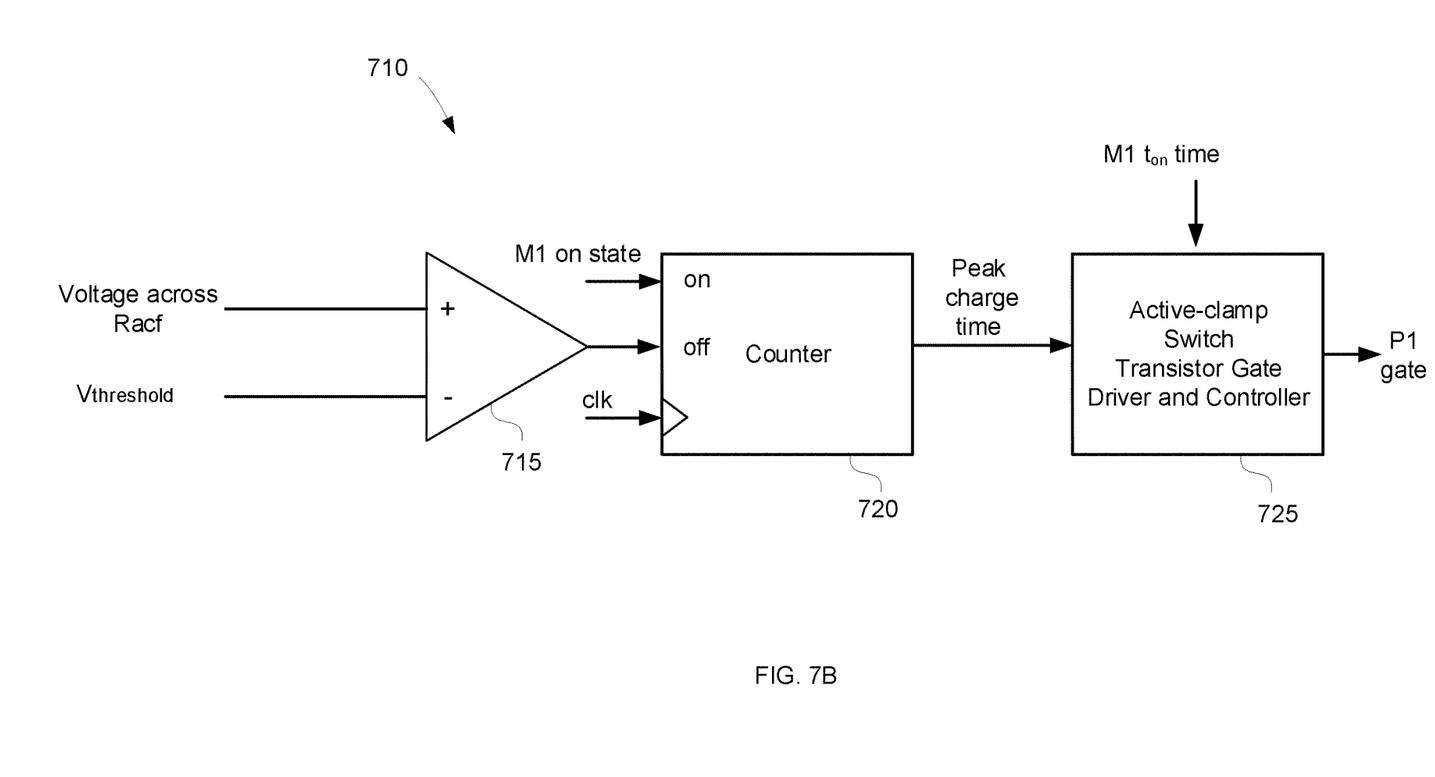
FIG. 7B illustrates is a circuit diagram of the active-clamp controller of the active-clamp flyback converter of FIG. 7A in accordance with an aspect of the disclosure.

There are numerous ways that an active-clamp controller may detect the peak charge time. For example, as shown in FIG. 7B, an active-clamp controller 710 may include a counter 720 that begins counting cycles of a clock signal when the counter is triggered to count by the power switch transistor (M1) gate voltage being discharged. A comparator 715 triggers counter 720 to stop counting when comparator 715 determines that the charging current stops flowing through the active-clamp capacitor. It is when the charging current falls to zero that the active-clamp capacitor is charged to its peak charge. For example, comparator 715 may compare the voltage across the active-clamp resistor Racf (shown in FIG. 7A) to a suitable threshold voltage such as 0 volt (or to a negative voltage slightly below 0 V). Counter 720 may thus provide a digital count that represents the peak charge time. A gate driver and controller circuit 725 is configured to use the peak charge time and the power switch transistor $t_{on}$ time to switch on the transistor P1 by grounding its gate at the difference time of the power switch transistor $t_{on}$ time—(the peak charge time). The measurement of the peak charge time may be performed at a startup of the active-clamp flyback converter. During operation, the measurement may be repeated as necessary to account for any temperature and voltage variations.

Figure 8:
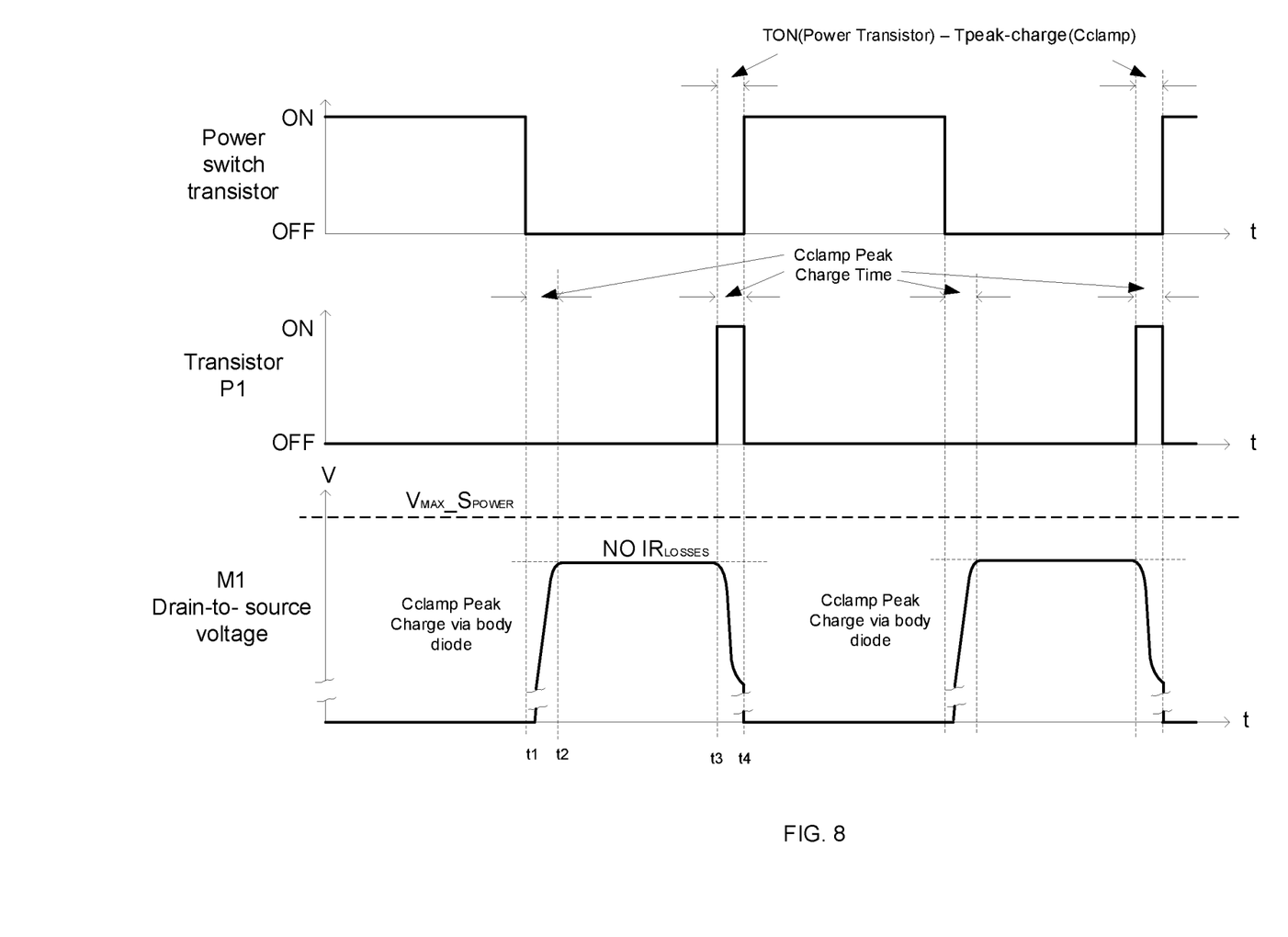
FIG. 8 illustrates some operating waveforms of the active-clamp flyback converter of FIG. 7A.

Some operating waveforms for flyback converter 700 are shown in FIG. 8. The power switch transistor cycles off at a time t1. The peak charging time then occurs from time t1 to a time t2. Since the body diode of transistor P1 conducts during the peak charging time, transistor P1 may remain off during this peak charging time. At time t3, the active-clamp controller switches on transistor P1 so that the active-clamp capacitor discharges for the peak charge time, which ends at time t4 when the power switch transistor again cycles on.

Figure 9:
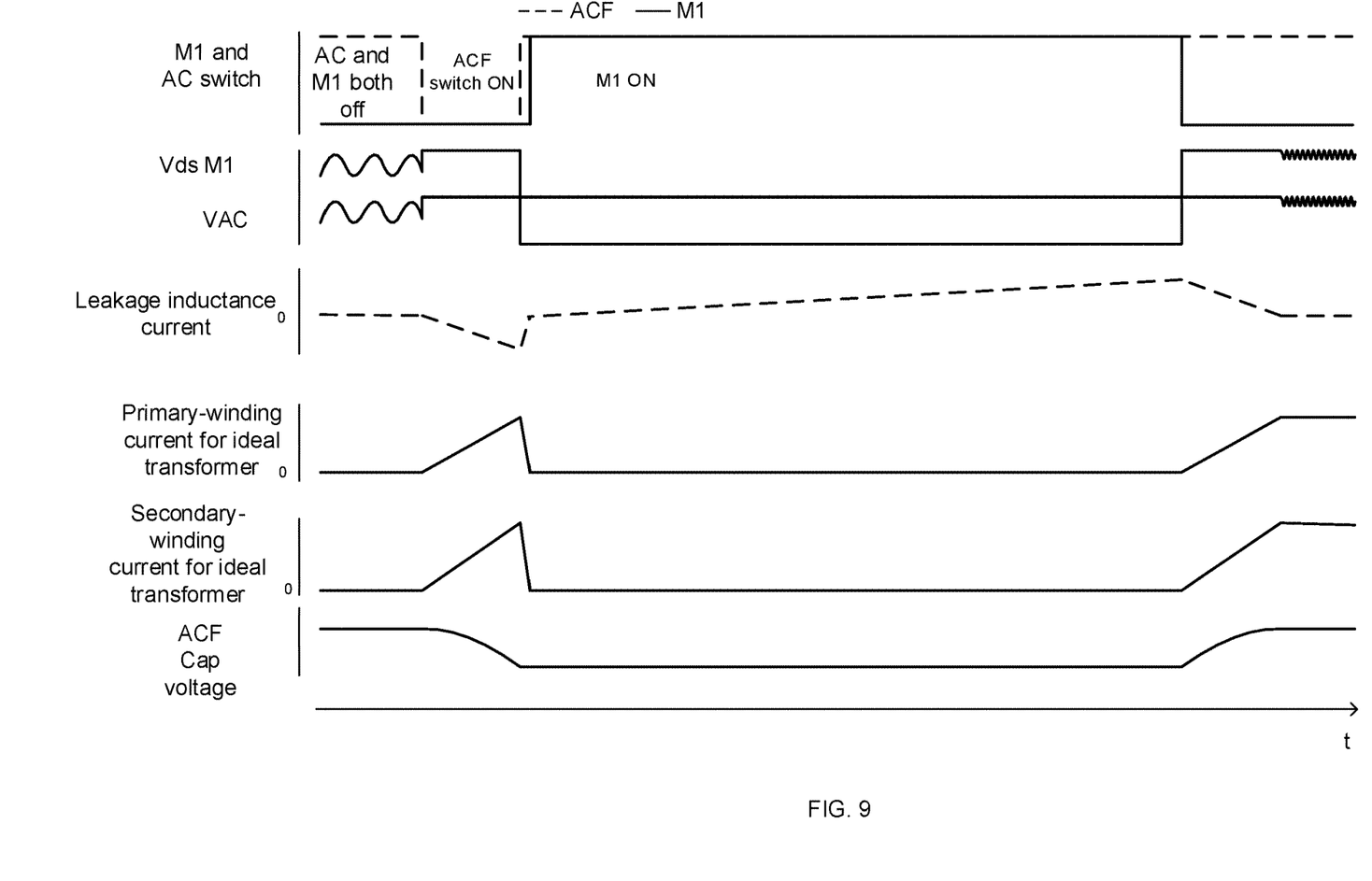
FIG. 9 illustrates some operating waveforms of the active-clamp flyback converter during DCM operation in accordance with an aspect of the disclosure.
Figure 10:
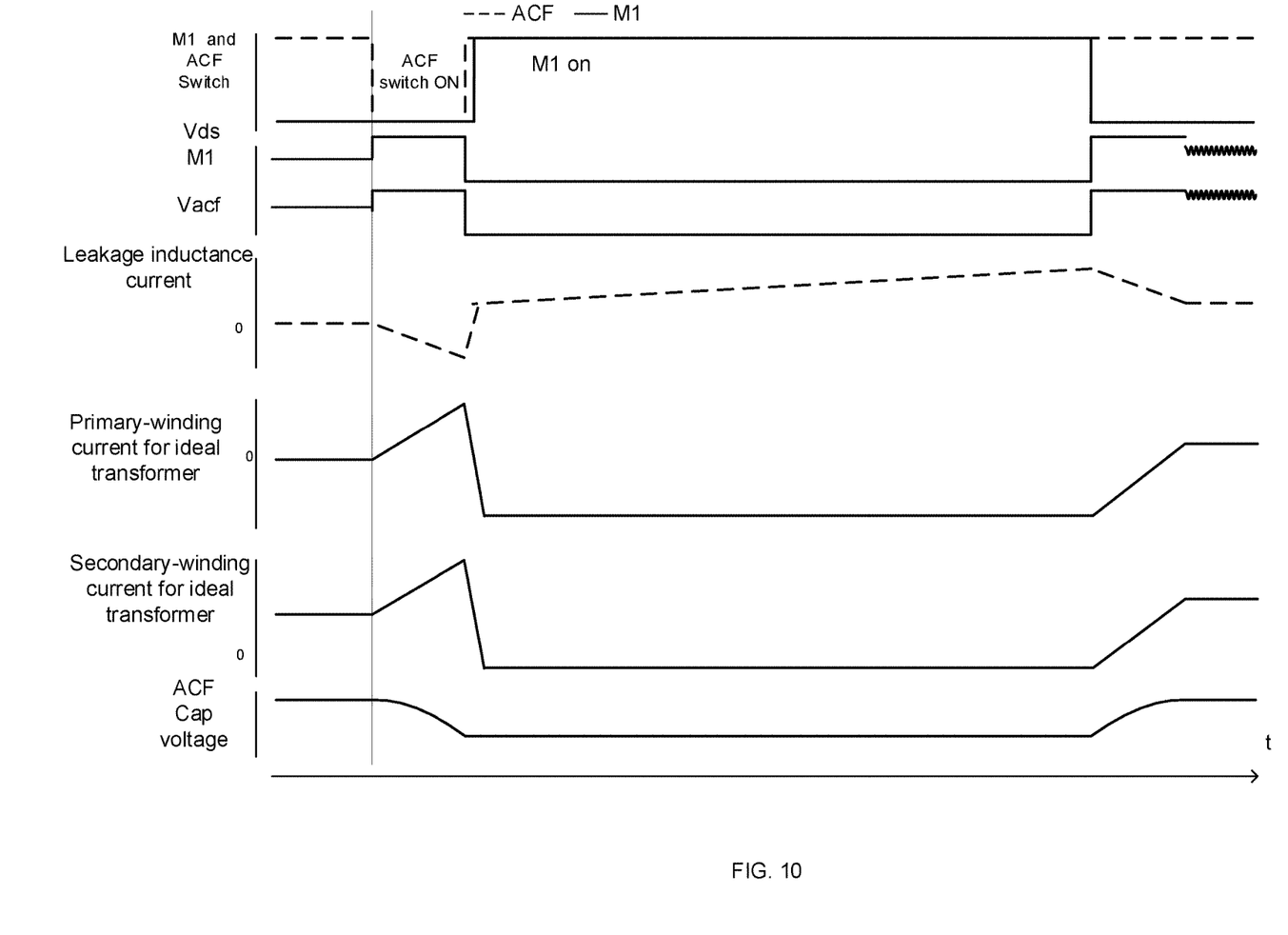
FIG. 10 illustrates some operating waveforms of the active-clamp flyback converter during CCM operation in accordance with an aspect of the disclosure.

The waveforms shown in FIG. 8 are independent of whether ACF flyback converter 700 operates in DCM or CCM. Waveforms for DCM operation during the discharge of the active-clamp capacitor and the subsequent on-time period of the power switch transistor are shown in FIG. 9. Prior to the on-time for the active-clamp (AC) switch transistor to discharge the active-clamp capacitor, the drain-to-source voltage across the power switch transistor M1 and the voltage across the active-clamp switch transistor (VAC) are both resonantly oscillating. During the on-time of the active-clamp switch transistor, the primary-winding and secondary-winding currents ramp slightly from zero. Note that these primary and secondary winding currents are those conducted by an ideal transformer. The leakage current declines negatively as the active-clamp capacitor discharges during the active-clamp switch on-time period. There is a small delay after the switch off of the active-clamp switch transistor before the power switch transistor cycles on. The waveforms during CCM as shown in FIG. 10 are similar except that the drain-to-source voltage for the power switch transistor M1 and the voltage across the active-clamp switch transistor are not resonantly oscillating prior to the on-time period of the active-clamp switch transistor.

Figure 11:
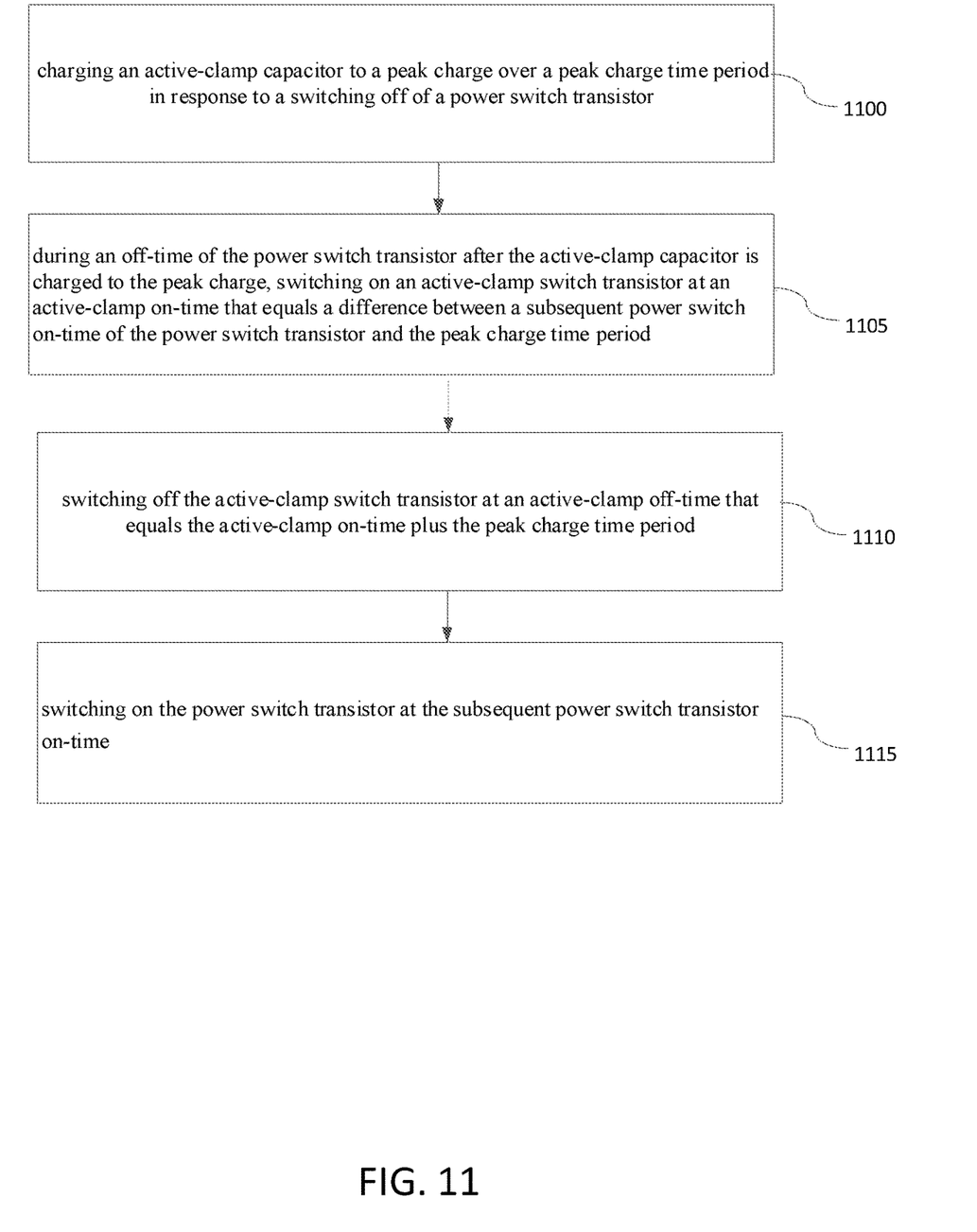
FIG. 11 is a flowchart for an example method of controlling an active-clamp switch transistor in accordance with an aspect of the disclosure.

A flowchart shown in FIG. 11 of an example method of active-clamp switch control will now be discussed. The method begins with an act 1100 of charging an active-clamp capacitor to a peak charge over a peak charge time period in response to a switching off of a power switch transistor. The charging of the active-clamp capacitor to the peak charge in any of flyback converters 500 and 700 is an example of act 1100. The method also includes an act 1105 that occurs during an off-time of the power switch transistor after the active-clamp capacitor is charged to the peak charge and includes switching on an active-clamp switch transistor at an active-clamp on-time that equals a difference between a subsequent power switch on-time of the power switch transistor and the peak charge time period. The switching on of the active-clamp switch transistor in any of flyback converters 500 and 700 at the beginning of the discharge of the active-clamp capacitor (time t3 of FIGS. 6 and 8) is an example of act 1105. In addition, the method includes an act 1110 of switching off the active-clamp switch transistor at an active-clamp off-time that equals the active-clamp on-time plus the peak charge time period. The switching off of the active-clamp switch transistor in any of flyback converters 500 and 700 at the end of the discharge of the active-clamp capacitor (time t4 of FIGS. 6 and 8) is an example of act 1110. Finally, the method includes an act 1115 of switching on the power switch transistor at the subsequent power switch transistor on-time. The switching on of the power switch transistor after the discharge of the active-clamp capacitor as illustrated in any of FIGS. 6, 8, 9, and 10 is an example of act 1115.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:

1. An active-clamp flyback converter, comprising:
a power switch;
an active-clamp switch;
an active-clamp capacitor in series with the active-clamp switch; and
an active-clamp controller configured to measure a peak charge time of the active-clamp capacitor and to switch on the active-clamp switch at a time equaling a difference between a turn-on time for the power switch and the peak charge time.

2. The active-clamp flyback converter of claim 1, wherein the active-clamp controller is configured to measure the peak charge time of the active-clamp capacitor at a startup of the active-clamp flyback converter.

3. The active-clamp flyback converter of claim 1, wherein the active-clamp switch is a PMOS transistor having a source coupled to a first plate of the active-clamp capacitor.

4. The active-clamp flyback converter of claim 3, wherein the power switch is an NMOS transistor having a drain coupled to a primary winding of a transformer, and wherein a second plate of the active-clamp capacitor is coupled to the drain of the NMOS transistor.

5. The active-clamp flyback converter of claim 3, wherein the PMOS transistor includes a body diode configured to conduct a charging current following an off-time of the power switch.

6. The active-clamp flyback converter of claim 3, wherein a drain of the PMOS transistor is coupled to ground through an active-clamp resistor.

7. The active-clamp flyback converter of claim 6, wherein the active-clamp controller includes:
a comparator configured to compare a voltage across the active-clamp resistor to a threshold voltage; and
a counter configured to provide a count representing the peak charge time, the counter being further configured to stop a counting of the count in response to an output signal from the comparator indicating that the voltage across the active-clamp resistor equals the threshold voltage.

8. The active-clamp flyback converter of claim 7, wherein the threshold voltage is ground.

9. The active-clamp flyback converter of claim 7, wherein the counter is further configured to begin a counting of the count responsive to the power switch cycling off.

10. The active-clamp flyback converter of claim 1, wherein the active-clamp controller is further configured to switch on the active-clamp switch for the peak charge time in response to a switch off of the power switch.

11. A method of operation for an active-clamp flyback converter, comprising:

measuring a peak charge time period during which an active-clamp capacitor charges to a peak charge in response to a switching off of a power switch transistor;

during an off-time of the power switch transistor after the active-clamp capacitor is charged to the peak charge, switching on an active-clamp switch transistor at an active-clamp on-time that equals a difference between a subsequent power switch on-time of the power switch transistor and the peak charge time period;

switching off the active-clamp switch transistor at an active-clamp off-time that equals the active-clamp on-time plus the peak charge time period; and switching on the power switch transistor at the subsequent power switch on-time.

12. The method of claim 11, wherein charging the active-clamp capacitor to the peak charge over the peak charge time period comprises conducting a charging current through a body diode of the active-clamp switch transistor while the active-clamp switch transistor is off.

13. The method of claim 11, wherein charging the active-clamp capacitor to the peak charge over the peak charge time period comprises switching on the active-clamp switch transistor for the peak charge time period.

14. The method of claim 11, wherein measuring the peak charge time period comprises determining when a charging current stops conducting through the active-clamp capacitor.

15. The method of claim 14, wherein determining when the charging current stops conducting comprises comparing a voltage across an active-clamp resistor to a threshold voltage.

16. The method of claim 15, wherein the threshold voltage is approximately zero volts.

17. An active-clamp controller for an active-clamp flyback converter, comprising:
   a comparator configured to compare a voltage across an active-clamp resistor to a threshold voltage;
   a counter configured to provide a count representing a peak charge time of an active-clamp capacitor, the counter being further configured to stop a counting of the count in response to an output signal from the comparator indicating that the voltage across the active-clamp resistor equals the threshold voltage; and
   an active-clamp switch transistor gate driver configured to switch on an active-clamp switch transistor at an active-clamp on-time that equals an on-time of a power switch transistor minus the peak charge time.

18. The active-clamp controller of claim 17, wherein the counter is further configured to begin the counting of the count responsive to a cycling on of the power switch transistor at a startup of the active-clamp flyback converter.

19. The active-clamp controller of claim 18, wherein the counter is configured to increment the count responsive to cycles of a clock signal.

* * * * *